(No Model.)
J. A. WADE & J. CHERRY.
PUMP.
No. 367,564. Patented Aug. 2, 1887.
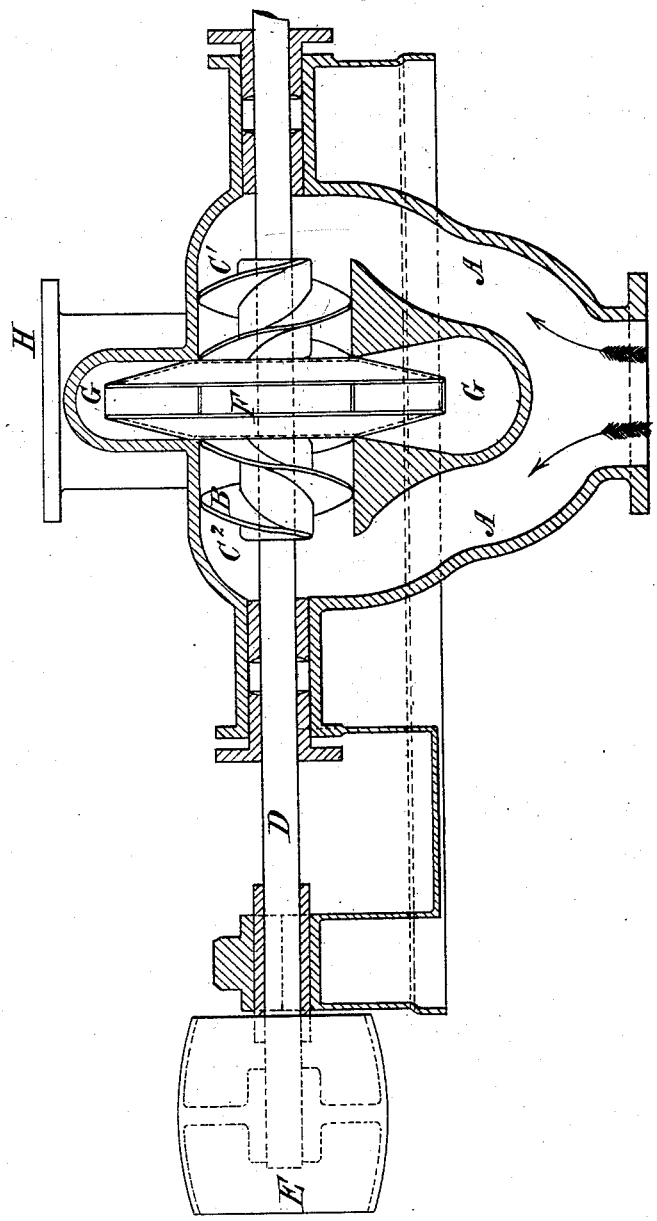
Witnesses.
Emil Herter.
Henry J. McBride
Inventors.
J. A. Wade
John Cherry
by attorneys
Brown & Call

UNITED STATES PATENT OFFICE.

JOSEPH A. WADE AND JOHN CHERRY, OF HORNSEA, COUNTY OF YORK, ENGLAND.

PUMP.

SPECIFICATION forming part of Letters Patent No. 367,564, dated August 2, 1887.

Application filed January 20, 1885. Serial No. 153,415. (No model.)

*To all whom it may concern:*

Be it known that we, JOSEPH ARMYTAGE WADE, of Hornsea, in the county of York, England, timber merchant, and JOHN CHERRY, of Hornsea aforesaid, brick and tile works manager, both subjects of the Queen of Great Britain, have invented an Improved Pump, of which the following is a specification.

The invention consists, essentially, in the combination, with a fan-casing of a centrifugal pump and a fan having a central water-receiving aperture and openings at its periphery, of a screw-chamber at the side of the fan casing, and a screw comprising one or more complete convolutions, closely fitting the screw-chamber and connected with the fan to rotate therewith, whereby water is delivered by the screw to the center of the fan and is by the fan thrown outward through its circumference. Two such screws with right and left hand pitch may be fitted closely to rotate in screw-chambers on opposite sides of the fan-casing, the fan being provided with water-receiving apertures on opposite sides, and the screw chamber or chambers may be truly or substantially cylindric. By this combination of right and left handed screws with the ordinary fan or disk the efficiency of the pump is greatly increased, being thereby rendered capable not only of discharging the same quantity of water as an ordinary centrifugal of the same size at lower pump-speeds, but also of delivering a larger volume of water. The pump will work with higher lifts, as well as with the power of sucking from a greater depth. It will also diminish the slip usually encountered by the centrifugal as hitherto constructed.

In some cases, in order to save space, a single screw with the fan or disk may be used.

The drawing is a longitudinal vertical section of the pump, showing also the means of driving it.

A is the pump-case.

B is the chamber in which revolve the right and left handed screws $C'$ and $C^2$, fixed on the shaft D, driven by the pulley E, working in stuffing-boxes, as shown.

F is the centrifugal fan or disk, which has a central water-receiving aperture at one or each side, according as whether screws are employed upon one or both sides, and which also has openings in its circumference, and by the rotation of the fan its blades or beaters are caused to act on the water entering it from the screws $C'$ and $C^2$ and force it through the water space or channel G G formed at the top and bottom of the chamber B, in which the screws $C'$ and $C^2$ revolve. This chamber is open at each end for the admission of water, which, by the converging action of the screws $C'$ and $C^2$, is directed into the center of the fan or disk F.

The screw chamber or chambers B are here shown as truly or substantially cylindric, and each screw, $C'$ or $C^2$, comprises one or more complete convolutions of a rib or flange.

On the water being drawn into the pump-case A from the suction-pipe at the bottom it is caused to pass in the directions indicated by the arrows and enter the screw-chamber B, whence, by the revolution of the screws $C'$ and $C^2$, it is delivered into the center of the revolving fan or disk F, and, being acted upon by the blades or beaters thereof, is forced through the water space or channel G G and discharged through the outlet H connected with the delivery-pipe. In this manner the efficiency of the fan or disk is increased by the combination therewith of the right and left handed screws.

In cases wherein it is requisite to economize space and weight, a single screw leading into the center of the fan or disk may be substituted for the right and left handed screws above described. In such cases the pump-case would be formed with an entrance for the water from the suction-pipe to the screw on one side only of the fan or disk.

We are aware that heretofore there has been on one or each side of a centrifugal-pump fan a body having upon it two or several spiral ribs or blades, none of which form more than a small fraction of or at most half of a convolution, and we do not claim such a combination as included in our invention. In our pump the screw or screws each comprise one or more complete convolutions, and the screw does not deliver water to the periphery of the fan, but to its center. The screws, each comprising one or more complete convolutions, are positive in their action, and as the convolutions snugly fit the screw-chambers they form an irresistible force to move the water positively to the center of the fan. The fan and its screws, each forming a complete convolution or more, will be effective in their action when rotating at a slow speed, while a fan having connected with it two or more spiral ribs, which at most form one-half a convolution, must be driven at a high speed to be effective.

Having fully described our invention, what we desire to claim, and secure by Letters Patent, is—

1. The combination, with the fan-casing of a centrifugal pump and a fan having a central water-receiving aperture and openings at its circumference, of a screw-chamber at the side of the fan-casing, and a screw comprising one or more convolutions, closely fitting the chamber and connected with the fan to rotate therewith, whereby water is delivered by the screw to the center of the fan and is by the fan thrown outward through its circumference, substantially as herein described.

2. The combination, with the fan-casing of a centrifugal pump and a fan having a central water-receiving aperture in its side and having openings in its circumference, of a substantially cylindric screw-chamber at the side of the fan-casing, and a screw comprising one or more complete convolutions, closely fitting the cylindric screw-chamber and connected with the fan to rotate therewith, whereby water is delivered by the screw to the center of the fan and is by the fan thrown outward through its circumference, substantially as herein described.

3. The combination, with the fan-casing and fan of a centrifugal pump, of screw-chambers on opposite sides of the fan-casing and right and left hand screws, each comprising one or more complete convolutions, closely fitting the screw-chambers and connected with the fan to rotate therewith, whereby water is delivered by the screws to the center of the fan, substantially as herein described.

J. A. WADE.
JOHN CHERRY.

Witnesses:
   G. F. SEATH,
1 *Albert Villas, the Boulevard, Hull.*
   W. L. SHOOTER,
98 *Freehold Street, Spring Bank, Hull.*